United States Patent [19]

Cyphers et al.

[11] Patent Number: 5,192,425
[45] Date of Patent: Mar. 9, 1993

[54] MOUNTING BASE AND ASSEMBLY FOR PRESSURE SENSOR, FILTER AND PRESSURE RELIEF VALVE

[75] Inventors: Norman A. Cyphers, Rogers; Dwaine D. Straight, St. Paul; Robert D. Cooper, Jr., Blaine, all of Minn.

[73] Assignee: Wagner Spray Tech Corporation, Minneapolis, Minn.

[21] Appl. No.: 733,226

[22] Filed: Jul. 22, 1991

[51] Int. Cl.$^5$ .................. B01D 35/14; B67D 5/33; B67D 5/58; G01L 7/06
[52] U.S. Cl. .................. 210/90; 29/451; 29/456; 29/741; 73/720; 73/756; 210/133; 222/61; 222/189; 239/590.3; 239/DIG. 14; 417/307; 417/388
[58] Field of Search .................. 210/90, 133, 420; 222/61, 189, 396, 400.7; 239/590.3, 590.5, DIG. 14; 401/188 R; 417/305, 307-309, 388; 73/720, 756; 29/451, 456, 458, 525.1, 741

[56] References Cited

U.S. PATENT DOCUMENTS

| | | | |
|---|---|---|---|
| 3,317,141 | 5/1967 | Mann | 417/388 |
| 3,502,221 | 3/1970 | Butterfield | 210/244 |
| 3,558,010 | 1/1971 | Zenger et al. | 222/61 |
| 3,614,352 | 10/1971 | Wiese | 200/82 C |
| 3,958,898 | 5/1976 | Abrahams et al. | 417/36 |
| 4,019,653 | 4/1977 | Scherer et al. | 222/1 |
| 4,335,999 | 6/1982 | Lamontagne et al. | 49/8 |
| 4,385,217 | 5/1983 | Culbertson et al. | 35/40 |
| 4,390,324 | 6/1983 | Karlinger | 417/282 |
| 4,397,610 | 8/1983 | Krohn | 49/6 |
| 4,501,533 | 2/1985 | Bower, Jr. | 417/388 |
| 4,574,988 | 3/1986 | Karlinger | 222/396 |
| 4,588,318 | 5/1986 | O'Brien et al. | 401/188 R |
| 4,711,268 | 12/1987 | Coleman | 73/756 |
| 4,722,230 | 2/1988 | Krohn | 73/755 |
| 4,768,929 | 9/1988 | Geberth, Jr. | 417/307 |
| 4,953,403 | 9/1990 | Springer | 73/198 |
| 4,971,368 | 11/1990 | Wood | 285/223 |
| 4,986,128 | 1/1991 | Burns | 73/744 |
| 5,059,099 | 10/1991 | Cyphers | 417/388 |

OTHER PUBLICATIONS

Catalog No. 956-A by Binks Manufacturing Co. of Chicago, Ill., "Everything for Spray Painting", Printed Jul. 1966.

Primary Examiner—Joseph W. Drodge
Attorney, Agent, or Firm—Faegre & Benson

[57] ABSTRACT

Single-piece manifold for use in pressurized painting equipment which is configured and arranged for joining a liquid inlet line, a pressure sensor, a filter, a pressure relief valve, and one or more liquid outlet lines by a streamlined network of passages in a compact and organized manner which eliminates static flow areas. The pressure sensor is assembled within the manifold in such manner as to avoid relative rotation between sensor components and thus avoid stressing electrical leads of the sensor.

16 Claims, 4 Drawing Sheets

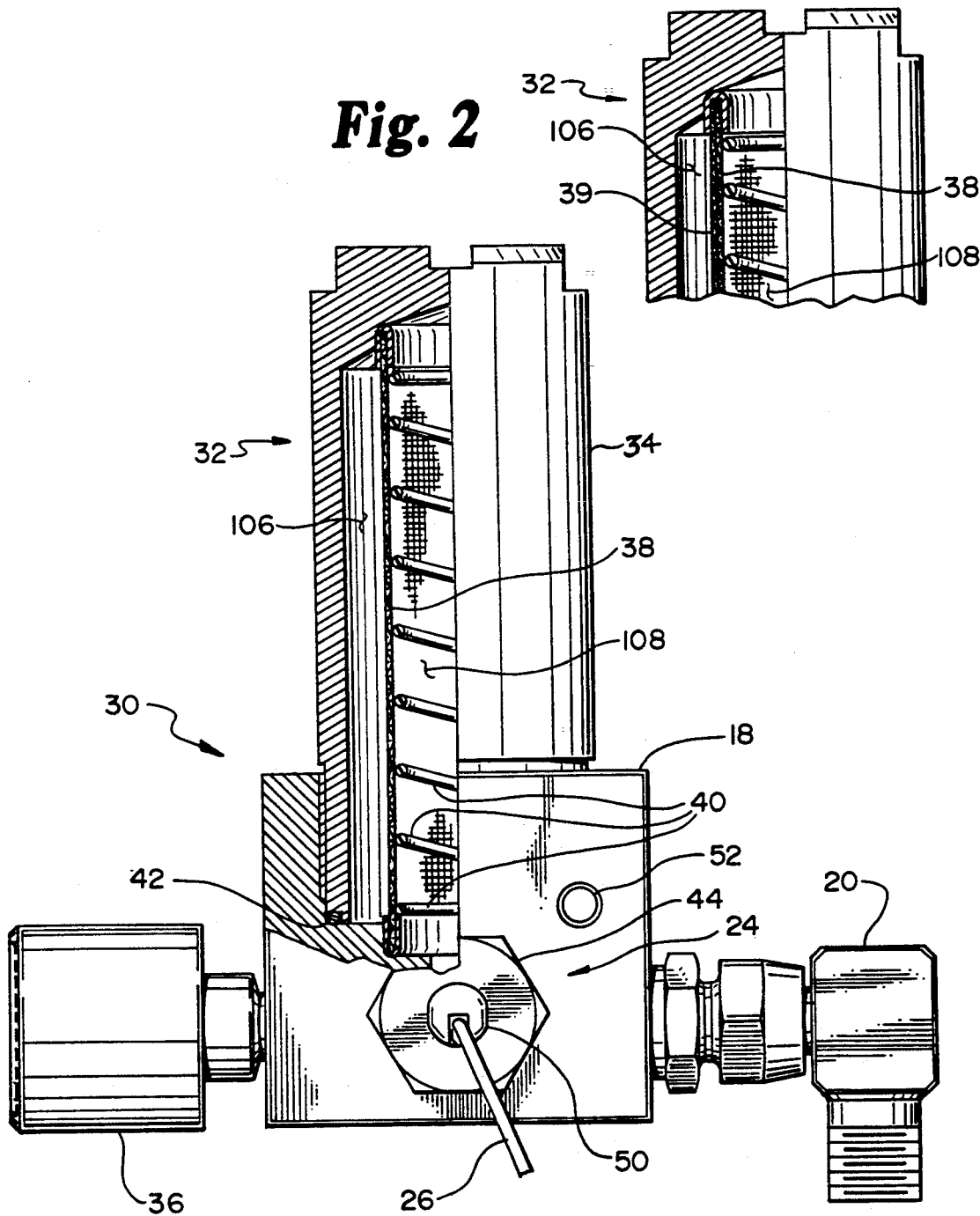

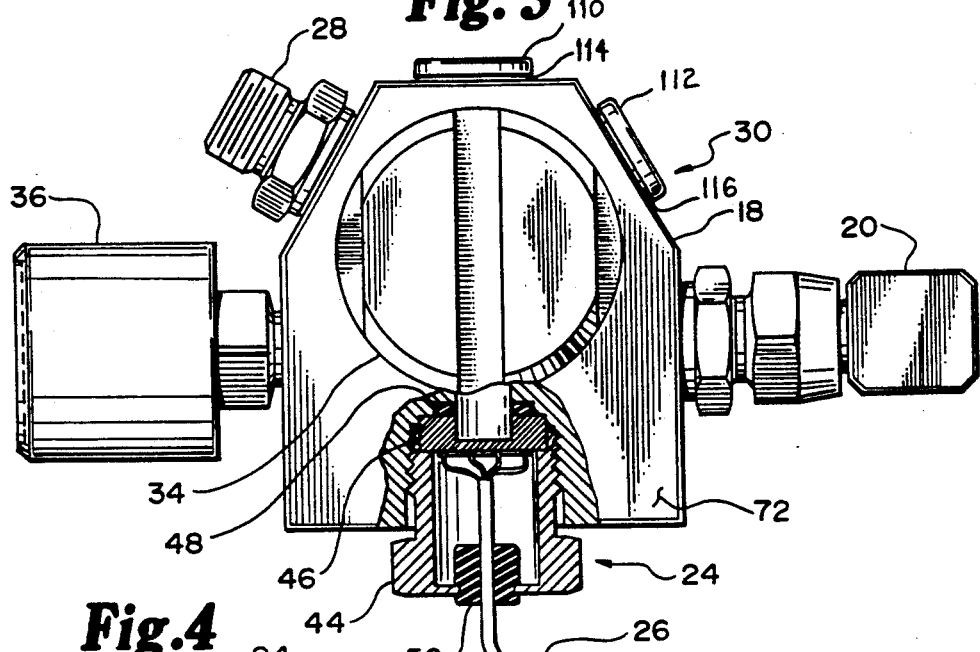
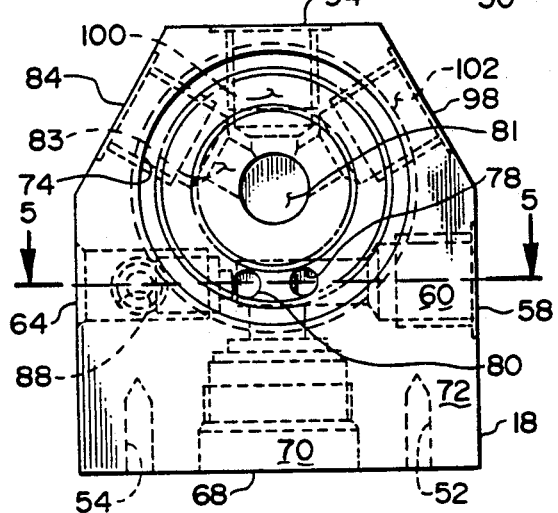
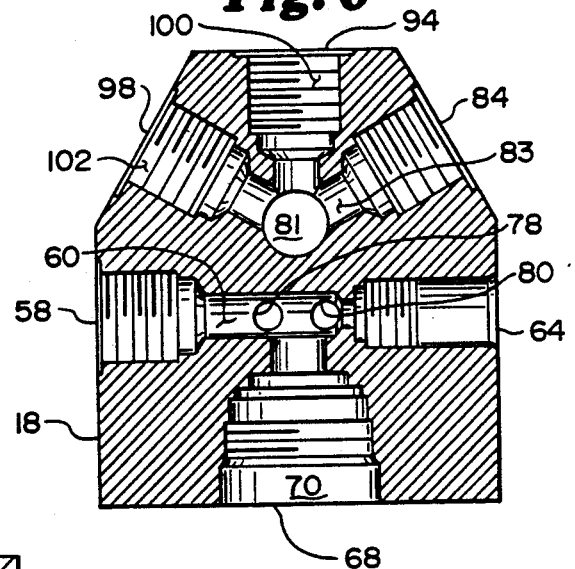
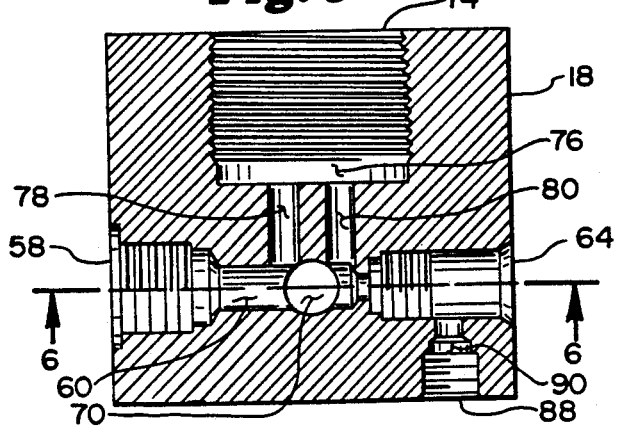

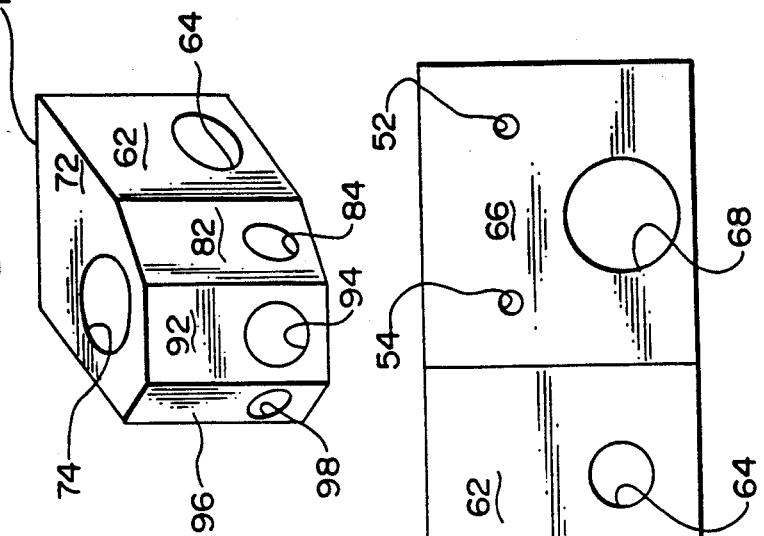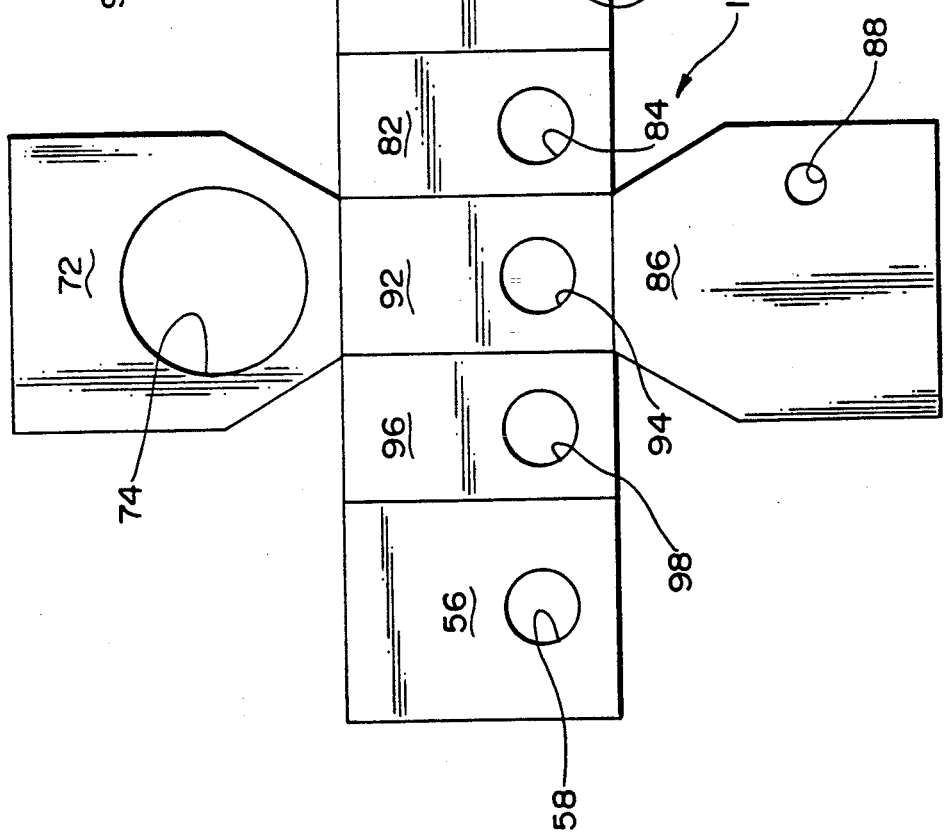

MOUNTING BASE AND ASSEMBLY FOR PRESSURE SENSOR, FILTER AND PRESSURE RELIEF VALVE

FIELD OF THE INVENTION

This invention relates to the field of pressurized painting equipment, more particularly to equipment operating at relatively high pressures and high flow rates.

BACKGROUND OF THE INVENTION

In the past, there has been a need to provide for various functions associated with pressurized painting equipment. Such functions have included filtering, pressure sensing, protecting against overpressure, and providing for plural paint guns operating from the same supply. The prior systems have suffered from various deficiencies including requiring separate attachments in the paint supply line and separate manifolds or supports for individual items providing these functions. Furthermore, in such prior art systems, it was often the case that static flow areas existed within the pressure sensor and filter manifolds, allowing paint solids to accumulate in such static flow areas, clogging and otherwise impairing the supply of paint through such systems.

The present invention overcomes deficiencies of the prior art by providing a unitary base for mounting an improved pressure sensor, a filter and a pressure relief valve. The base further provides plural outlets, all with a streamlined flow path through the base to avoiding static flow areas which might otherwise clog with paint.

BRIEF DESCRIPTION OF THE DRAWINGS

FIG. 2 shows a partially cut away side elevation view of the apparatus of the present invention.

FIG. 2a shows a fragmentary partially cut away side elevation view of an alternative embodiment of the filter element of the present invention.

FIG. 3 shows a partially cut away top view of the present invention.

FIG. 4 shows a top view of the unitary base of the present invention with internal passageways shown in phantom.

FIG. 5 shows a section view taken along line 5—5 of FIG. 4.

FIG. 6 shows a section view taken along line 6—6 of FIG. 5.

FIG. 7 shows a perspective view of a simplified outline of the unitary base of the present invention.

FIG. 8 shows a schematic view of the faces of the unitary base shown in FIG. 7.

DETAILED DESCRIPTION

Figure 1:
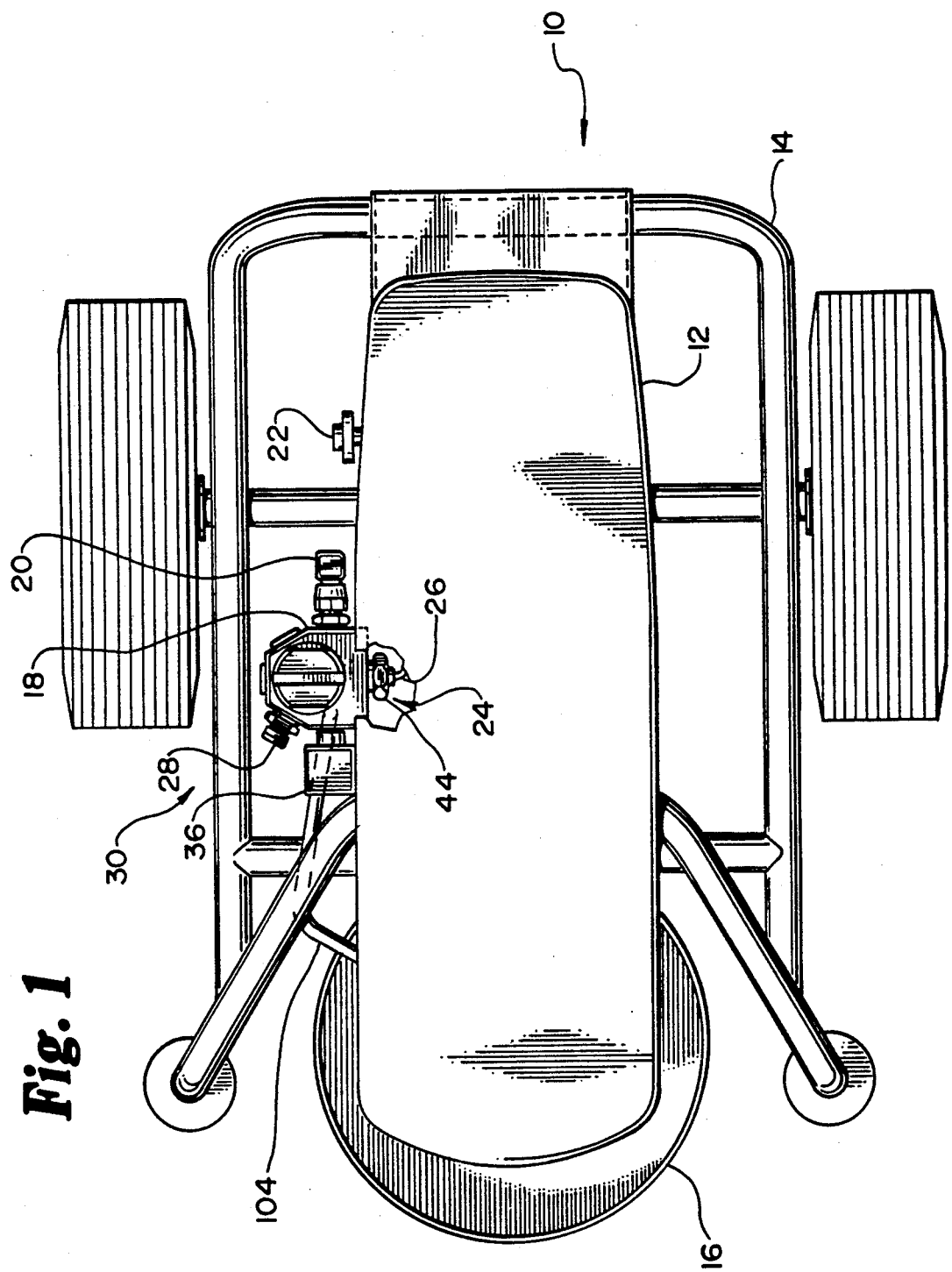
FIG. 1 shows a partially cut away top view of a paint apparatus with the combined pressure sensor and filter apparatus of the present invention installed thereon.

Referring now to FIG. 1, a portable pressurized painting system 10 may be seen. System 10 preferably has a pump (not shown) within an enclosure 12 mounted on a wheeled cart 14 to draw paint from a container 16 via a syphon or suction tube (not shown). Paint is supplied to the unitary base 18 via a conventional inlet paint supply line or right-angle fitting 20.

It is to be understood that enclosure 12 preferably houses a gas engine or electric motor driving a paint pump which regulates paint supply system pressure to a level set by an operator-adjustable knob 22. The pressure control system (not shown) utilizes a pressure feedback signal from a pressure sensor 24 which provides an electrical signal on leads 26 proportional to the paint supply pressure sensed by sensor 24. Paint is preferably supplied from base 18 via an outlet paint supply line fitting 28 which, in practice, is preferably connected to a paint supply hose (not shown) providing paint to an operator-controlled paint spray gun (also not shown).

Referring now also to FIGS. 2 and 3, base 18 is part of an apparatus 30 which includes a cylindrical filter 32 carried in a filter housing 34. It is to be understood that apparatus 30 also preferably includes pressure sensor 24, and a pressure relief valve 36.

Filter assembly 32 preferably includes a cylindrical filter element 38 supported by a helical spring 40. Housing 34 is preferably sealed to base 18 by an O-ring 42 or other conventional seal.

Referring now to FIGS. 2 and 2a, it is to be understood that various mesh filter elements may be used to remove particulates from the paint supply line which particulates could otherwise plug metering orifices in a spray gun (not shown) connected to system 10. In FIG. 2 a single layer element 38 is shown, which preferably is a 20 mesh or sieve size. In FIG. 2a, element 38 is preferably a 24 mesh element provided to support a finer mesh element layer 39. Layer 39 may be a 50, 100, 200 or other mesh or sieve size to filter finer particulates, as desired.

Referring now to FIGS. 2 and 3, pressure sensor 24 preferably includes a threaded housing 44 which serves as a compression means received in base 18 for urging a sensor element 46 against an O-ring seal 48 and against base 18. Sensor element 46 is preferably formed of #17-4PH stainless steel and carries a strain gauge patch bonded thereto. The strain gauge patch and stainless steel element are available from Revere Corporation of America, 845 North Colony Road,, Wallingford, Conn. 06492 as a model PT10 pressure diaphragm. Sensor 24 further preferably includes a strain relief 50 for leads 26. Sensor element 46 is preferably received in and secured to housing 44 by a suitable adhesive such as, for example, one which meets U.S. military specification MIL-R-46082, Type I. One such adhesive is a type 609 available from Loctite Corporation, Newington, Conn. 06111. Element 46 is secured to housing 44 to prevent rotation between these parts during assembly and disassembly, which could otherwise unduly stress leads 26. It is to be further understood that other means of preventing relative rotation may be used between element 46 and housing 44, such as, for example, providing mating "keying" surfaces on each of those parts to prevent relative rotation.

Referring now also to FIG. 4, base 18 also preferably includes a pair of blind threaded bores 52, 54 for mounting apparatus 30 to a bracket (not shown) secured to cart 14.

Referring now also to FIGS. 4–8, features of base 18 may be seen in more detail. Referring first most particularly to FIGS. 7 and 8, simplified views of base 18 may be seen. FIG. 7 shows a simplified perspective view of base 18, and FIG. 8 is an "unfolded" or schematic view of the surfaces of base 18 and the ports in each surface. In its preferred form, base 18 has eight surfaces. The first surface 56 preferably has an inlet port 58 therein. A first bore 60 (see FIGS. 4–6) extends from inlet port 58 in first surface 56 through base 18 to the second face 62 and ends in a pressure relief valve mounting port 64. Base 18 preferably further has a third face 66 having a pressure sensor mounting port 68 therein. Face 66 preferably also has the pair of blind threaded bores 52, 54 therein. Port 68 connects to a second bore 70 extending from third face 66 into base 18 transverse to and intersecting first bore 60.

Base 18 also preferably has a fourth face 72 having a filter mounting port 74 therein. A third bore 76 extends from 74 in fourth face 72 into base 18 transverse to the first bore 60 and preferably also has a pair of channels 78, 80 communicating between the first bore 60 and third bore 76. Third bore 76 preferably has an extension 81 communicating bore 76 to a fourth bore 83.

Base 18 also preferably has a fifth face 82 having a paint outlet port 84 therein. Port 84 is in communication with bore 83. Base 18 also preferably has a sixth face 86 having a pressure relief outlet port 88 therein. Port 88 in face 86 is preferably connected via a fifth bore 90 to intersect first bore 60 adjacent pressure relief valve mounting port 64. Base 18 also preferably has seventh face 92 having a further outlet port 94; base 18 also preferably has an eighth face 96 having a still further outlet port 98 therein. Each of outlet ports 94, 98 respectively has sixth and seventh bores 100, 102 communicating with extension 81. If it is desired to use less than all outlet ports 84, 94, 98, it is to be understood that the unused ports are to be closed by conventional plugs 110, 112 sealed by metal washers 114, 116 as shown in FIG. 3.

It is to be understood that pressure relief valve 36 extends into bore 60 substantially filling bore 60 from port 64 up to but not obscuring or interfering with channel 80. In the event that pressure within bore 60 exceeds a predetermined level set in valve 36, valve 36 will actuate to open a pressure relief passage from channel 80 and bore 60 to bore 90, thus allowing paint to escape through port 88. It is further to be understood that it is preferable that a paint return line 104 (see FIG. 1) be connected to the pressure relief outlet port 88 so as to return paint to container 16 in the event of actuation of the pressure relief valve 36. For pressures below the predetermined value set in valve 36, valve 36 remains closed, providing a relatively streamlined path from inlet port 58 through bore 60 and into channels 78, 80 characterized by the absence of static flow areas.

Referring now also to FIG. 2 more particularly, paint flowing through channels 78, 80 enters a cylindrical annular region 106 exterior of filter element 38. Paint passes through filter element 38 radially inwardly from the upstream side 106 of filter 38 to the downstream side of filter 38 formed by cylindrical region 108. Downstream side 108 of filter 38 is in communication with extension 81 allowing paint to be delivered to the paint outlet port 84 via bore 83.

Filter element 38 is able to be inspected, cleaned and replaced if necessary by removal of filter housing 34 from base 18.

It is to be understood that the unitary base shown carrying the pressure sensor and filter provides a relatively streamlined flow path from inlet port 58 past pressure sensor 24 to the filter 32 such that paint solids are carried away from the pressure sensor 24 when a solvent is flushed through a paint supply line connected to inlet fitting 20. It is further to be understood that paint solids not trapped by the filter 32 are carried away from the base 18 when a solvent is flushed through the paint supply line.

The invention is not to be taken as limited to all of the details thereof as modifications and variations thereof may be made without departing from the spirit or scope of the invention.

What is claimed is:

1. A combined pressure sensor and filter assembly for pressurized painting systems comprising:
   a) a strain gage type pressure sensor for transducing pressure in a paint supply line;
   b) a cylindrical filter having an upstream side and a downstream side and located downstream from the pressure sensor for removing particulates from paint in the paint supply line;
   c) a pressure relief valve located upstream of the filter for limiting pressure in the paint supply line from rising above a predetermined maximum pressure;
   d) a base formed of a single block of metal and having a plurality of faces on the exterior thereof and carrying the pressure sensor, filter and pressure relief valve and wherein the base has
      i) a first straight bore extending through first and second faces of the base and forming an inlet port at an upstream end thereof in the first face and a pressure relief valve mounting port receiving and mounting the pressure relief valve therein at a downstream end of the first bore in the second face,
      ii) a second bore extending from a third face into the base transverse to and intersecting the first bore, the second bore forming a pressure sensor mounting port,
      iii) a third bore extending from a fourth face into the base transverse to the first bore and having at least one channel communicating between the first and third bores and wherein the third bore forms a filter mounting port such that the channel is in communication with the upstream side of the filter, and
      iv) a fourth bore extending from a fifth face into the base forming a paint outlet port and communicating with the downstream side of the filter wherein the flow path from the inlet path past the pressure sensor is relatively streamlined such that paint solids are carried away from the pressure sensor when a solvent is flushed through the base.

2. The assembly of claim 1 wherein the base further comprises
   v) a fifth bore extending from a sixth face into the base and intersecting the downstream end of the first bore and forming a pressure relief outlet port.

3. The assembly of claim 2 wherein the base further comprises a plurality of paint outlet ports, each communicating with a downstream side of the filter.

4. An assembly for directing and controlling fluid flow in a pressurized painting systems comprising:
   (a) a single-piece body having (i) a paint inlet port, (ii) a first paint outlet port, (iii) a pressure sensor mounting port downstream of the paint inlet port, (iv) a filter mounting port downstream of the pressure sensor mounting port, (v) a pressure relief mounting port linearly opposed to the paint inlet port, and (vi) a network of passages interconnecting the paint inlet port, first paint outlet port, pressure sensing mounting port and filter mounting port which is effective for providing fluid communication therebetween and includes a first straight bore extending continuously from the paint inlet port to the pressure relief mounting port, (b) a paint supply line in fluid communication with the paint inlet port, (c) a first paint delivery line in fluid communication with the first paint outlet port, (d) a filter effective for removing particulate material from paint in fluid communication with the filter mounting port, (e) a pressure sensor in fluid communication with the pressure sensor mounting port which is effective for sensing the pressure within the network of passages at a point upstream of the filter and generating a signal proportional to the sensed pressure, and (f) a pressure relief valve in fluid communication with the pressure relief mounting port effective for decreasing the pressure within the body by externally venting paint from the network of passages through the pressure relief mounting port whenever a predetermined maximum pressure is reached within the body.

5. The assembly of claim 4 further comprising a seal between the pressure sensor and the body.

6. The assembly of claim 5 wherein the seal comprises an O-ring.

7. The assembly of claim 5 wherein the pressure sensor further comprises compression means effective for sealingly urging the pressure sensor against the seal and the body.

8. The assembly of claim 7 wherein the network of passages includes a threaded pressure sensor retaining bore extending from the pressure sensor mounting port and the compression means comprises a threaded collar effective for threadable insertion in the threaded pressure sensor retaining bore so as to compress the pressure sensor against the seal.

9. The assembly of claim 8 further comprising securing means for securing the pressure sensor against rotation with respect to the threaded collar.

10. The assembly of claim 9 wherein the securing means comprises an adhesive effective for coupling the pressure sensor and the threaded collar into a unitary component.

11. The assembly of claim 4 wherein the pressure sensor comprises a strain gage patch bonded to a stainless steel element.

12. An assembly for directing and controlling fluid flow in a pressurized painting systems comprising:

(a) a single-piece manifold having (i) a fluid inlet port, (ii) a fluid outlet port, (iii) a pressure sensor mounting port downstream of the inlet port, and (vi) a network of passages interconnecting the inlet port, outlet port, and pressure sensing mounting port which is effective for providing fluid communication therebetween, (b) a fluid supply line in fluid communication with the inlet port, (c) a fluid delivery line in fluid communication with the outlet port, and (d) a pressure sensor in fluid communication with the pressure sensor mounting port which is effective for sensing the pressure within the network of passages; generating a signal proportional to the sensed pressure; and transmitting the signal through an electrical lead extending from the pressure sensor, (e) compression means effective for urging a distal end of the pressure sensor into a passage within the manifold through the pressure sensor mounting port and into sealing engagement with the manifold by rotation of the compression means; the compression means being in physical communication with the electrical lead such that rotation of the compression means relative to the electrical lead effects a torsional stress upon the electrical lead, and (f) securing means effective for preventing rotation between the pressure sensor and compression means during assembly and disassembly of the pressure sensor and compression means within the pressure sensor mounting port of the manifold.

13. The assembly of claim 12 further comprising a pressure relief mounting port in the manifold and a pressure relief valve in fluid communication with the pressure relief mounting port which is effective for decreasing the pressure within the manifold by externally venting fluid from the network of passages through the pressure relief mounting port whenever a predetermined maximum pressure is reached within the manifold.

14. The assembly of claim 13 wherein the network of passages includes a first bore extending continuously from the fluid inlet port to the pressure relief mounting port.

15. The assembly of claim 12 further comprising a filter mounting port in the manifold downstream from the pressure sensor port and a filter effective for removing particulate material from a fluid traveling through the manifold in fluid communication with the filter mounting port.

16. The assembly of claim 12 wherein (i) the network of passages includes a threaded pressure sensor retaining bore extending from the pressure sensor mounting port, and (ii) the compression means comprises a threaded collar effective for threadable insertion into the threaded pressure sensor retaining bore so as to sealingly compress a distal end of the pressure sensor against the manifold.

* * * * *